Patented June 15, 1948

UNITED STATES PATENT OFFICE 2,443,254

SEPARATION OF COLUMBIUM AND TANTALUM OXIDES

William J. Kroll, Albany, Oreg., and Frederick E. Bacon, Niagara Falls, N. Y., assignors to Electro Metallurgical Company, a corporation of West Virginia No Drawing. Application December 7, 1945, Serial No. 633,558

2 Claims. (Cl. 23—17)

This invention relates to the treatment of materials containing a mixture of columbium and tantalum compounds and refers more particularly to methods of recovering from such materials either a substantially tantalum-free columbium compound, a substantially columbium-free tantalum compound, or a mixture of columbium compound and tantalum compound in which the ratio of elemental columbium to elemental tantalum is substantially different from that in the starting material.

Columbium and tantalum almost invariably occur together in nature. Their separation from each other is extremely difficult because of the similar properties these elements possess, and processes for their separate recovery are tedious and expensive. Because of the increasing use of these elements in industry, there is a demand for an economical and efficient method of separately recovering columbium and tantalum from materials containing a mixture of compounds of the two elements. A particular demand exists in the metal industries for a product in which the ratio of elemental columbium to elemental tantalum is not less than ten to one.

It is the principal object of this invention to satisfy these demands. More specifically, it is an object of the invention to produce a substantially tantalum-free compound of columbium from a material containing compounds of both columbium and tantalum. Another object is the production of a tantalum compound substantially free from columbium.

The invention by means of which these objects are achieved is a method comprising the selective reduction of columbium oxide in a material containing oxides of both columbium and tantalum followed by the selective halogenation of the reduced columbium oxide, to form a volatile halide of columbium, and the distillation and condensation of the columbium halide so formed separately from any tantalum compound.

In accordance with the invention, a material containing columbium and tantalum pentoxides preferably in finely-divided form, is subjected to the action of hydrogen to effect a partial reduction of columbium oxide without reducing tantalum oxide. Under proper conditions substantially all of the columbium pentoxide present in the material is selectively reduced to columbium tetroxide. The columbium tetroxide so produced is then subjected to the action of a halogen, either chlorine, bromine, or iodine, or a halogen-liberating compound, for example, a dissociable halide such as ferric chloride, to produce a volatile halide of columbium. The columbium halide is then distilled and condensed separately from the residue.

Illustrative of a preferred manner of practicing the invention, the material to be treated, a finely-divided mixture of the pentoxides of columbium and tantalum, derived for instance from an ore by conventional methods, is placed in relatively shallow layers in a container in which it is subjected to the action of dry, nitrogen-free gaseous hydrogen, while being heated at a temperature between about 600° C. and 1200° C., say at 900° C. Under these conditions the reduction of columbium pentoxide proceeds in accordance with the reaction:

$$Cb_2O_5 + H_2 \rightleftarrows Cb_2O_4 + H_2O$$

In the reduction step just described, it is important that the hydrogen used be dry, to prevent reoxidation of columbium tetroxide to columbium pentoxide, and that it be free from nitrogen. Any nitrogen present in the hydrogen has a tendency to react with both columbium and tantalum oxide, if the temperature exceeds 900° C. thereby destroying the selectivity of the reduction step. It is also important that a temperature of about 1200° C. be not exceeded, for tantalum pentoxide is reduced by hydrogen at temperatures above 1200° C. The hydrogen is most suitably passed slowly through the container until at least the stoichiometric quantity required for the reaction has been used to permit the reaction to go to completion to the right.

Upon completion of the reduction step, the hydrogen is replaced by gaseous chlorine, a preferred halogenating agent, and the temperature is reduced to about 400° C. to 600° C. Within this temperature range columbium tetroxide reacts with chlorine to produce columbium chloride and columbium pentoxide, in accordance with the reaction:

$$5Cb_2O_4 + 5Cl_2 \rightarrow 2CbCl_5 + 4Cb_2O_5$$

but the tantalum pentoxide present in the mixture is unaffected. The columbium chloride formed is volatile and is recovered separately from the residue of mixed pentoxides of columbium and tantalum by conventional distillation and condensation operations.

The reactions set forth above indicate that the maximum theoretical removal of columbium attained by a single reduction and halogenation cycle conducted as described is 20%. Accordingly, for effective separation of columbium from tantalum, the cycle must be repeated a number of times, the number of cycles to be used in a given instance being determined by economic considerations depending on whether the primary objective is the production of tantalum-free columbium compound, recovered as a condensate or of a substantially columbium-free residue of tantalum pentoxide. If the latter product is desired a greater number of cycles will be necessary than if the former product is desired. The approximate proportion of columbium remaining in the residue after a given number of cycles may be determined from the formula $Cb_{(final)} = 0.8^n Cb_{(initial)}$, in which $n$ is the number of cycles.

In one test of the method of invention, a mixture of columbium pentoxide and tantalum pentoxide containing about 33% columbium and 41% tantalum, was treated with dry hydrogen at a temperature of 900° C. for one hour. Gaseous chlorine was then used in the halogenation step which was conducted at a temperature of 500° C. for a half hour. Columbium chloride was recovered by distillation and condensation. The cycle was repeated four times, and the condensate of columbium chloride was found to be free of tantalum and to contain about 60% of the columbium present in the original mixture. The residue after this treatment contained about 17% columbium and 60% tantalum.

The method of the invention has advantages over prior methods of separating columbium from tantalum in that its reactions are easily controlled and may be conducted in simple apparatus. One prior method of treating mixed oxides of tantalum and columbium with which the invention may be compared comprises chlorinating such oxides at a temperature of 1050° C. This method has several disadvantages avoided by the invention. For example, the temperature of chlorination in the prior method is quite critical. If a temperature much above 1050° C. is attained, tantalum chloride is formed, contaminating the product. On the other hand, unless the temperature is maintained at or about 1050° C., little columbium oxide is halogenated. To add to the difficulty of temperature control, the reaction between columbium pentoxide and chlorine is exothermic, thereby tending to raise the temperature to above 1050° C. A further difficulty is that of providing and maintaining apparatus for chlorination at such high temperatures. The reduction step in the method of this invention makes possible the use of the relatively low temperature of 400° C. to 600° C. in the halogenation step, and thus the disadvantages of the prior method are avoided.

Although the invention has been described with particular reference to the use of specific reducing and halogenating agents, it is not limited to the use of those particular agents. Moreover although the starting material used contains the pentoxides of columbium and tantalum, mixtures of other compounds of tantalum and columbium may be treated by the method of the invention by first converting such compounds to the respective pentoxides. The reducing and the halogenating steps can be carried out in the presence of non-interfering substances associated with the columbium-tantalum mixture.

We claim:

1. A method of recovering a columbium compound substantially free of tantalum from a material containing both tantalum and columbium oxides, which method comprises selectively reducing columbium oxide by the action of hydrogen thereon at a temperature of about 600° C. to 1200° C. without reducing tantalum oxide in said material, selectively halogenating with a halogenating agent selected from the group consisting of chlorine, bromine, iodine, and dissociable compounds thereof said reduced columbium oxide without halogenating said tantalum oxide, thereby producing a volatile columbium halide; and distilling and condensing such halide.

2. A method of recovering a columbium compound substantially free of tantalum from a material containing both tantalum and columbium oxides, which method comprises subjecting said material to the action of hydrogen at a temperature of about 600° C. to 1200° C., whereby to reduce columbium oxide selectively; subjecting said reduced columbium oxide to the action of gaseous chlorine at a temperature of about 400° C. to 600° C., whereby to form a volatile chloride of columbium, and distilling and condensing said columbium chloride separately from said material.

WILLIAM J. KROLL.
FREDERICK E. BACON.

REFERENCES CITED

The following references are of record in the file of this patent:

UNITED STATES PATENTS

| Number | Name | Date |
| --- | --- | --- |
| 1,834,622 | Jenness | Dec. 1, 1931 |